US012315979B2

(12) United States Patent
Nasum et al.

(10) Patent No.: US 12,315,979 B2
(45) Date of Patent: May 27, 2025

(54) SPREAD SPECTRUM MODULATION TECHNIQUE FOR ISOLATION DEVICES

(71) Applicant: TEXAS INSTRUMENTS INCORPORATED, Dallas, TX (US)

(72) Inventors: Sreeram Subramanyam Nasum, Bangalore (IN); Kashyap Barot, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/750,659

(22) Filed: May 23, 2022

(65) Prior Publication Data
US 2023/0378624 A1 Nov. 23, 2023

(51) Int. Cl.
*H01P 1/36* (2006.01)
*H04B 1/16* (2006.01)
*H04B 1/69* (2011.01)

(52) U.S. Cl.
CPC ............ *H01P 1/36* (2013.01); *H04B 1/16* (2013.01); *H04B 1/69* (2013.01)

(58) Field of Classification Search
CPC .............. H01P 1/36; H04B 1/16; H04B 1/69
See application file for complete search history.

(56) References Cited

U.S. PATENT DOCUMENTS

| 5,136,614 | A  | * | 8/1992  | Hiramatsu | H04L 27/02 380/34 |
| 7,923,818 | B2 | * | 4/2011  | De Vreede | H03J 3/185 257/E29.344 |
| 8,772,909 | B1 | * | 7/2014  | Vinciarelli | H01F 27/363 257/700 |
| 10,693,379 | B2 | * | 6/2020  | Moon | H02M 3/01 |
| 11,096,253 | B1 | * | 8/2021  | Mays, II | H05B 45/10 |
| 2016/0111965 | A1 | * | 4/2016  | Wang | H01F 41/041 363/21.04 |
| 2018/0278229 | A1 | * | 9/2018  | Sankaran | H03H 7/03 |
| 2019/0222126 | A1 | * | 7/2019  | Parisi | H02M 3/33523 |
| 2019/0305608 | A1 | * | 10/2019 | Pentakota | H01L 23/495 |
| 2023/0010364 | A1 | * | 1/2023  | Hansson | H04B 5/005 |
| 2023/0101061 | A1 | * | 3/2023  | Fabbro | H03K 17/691 361/115 |

* cited by examiner

*Primary Examiner* — Dac V Ha
(74) *Attorney, Agent, or Firm* — Mandy Barsilai Fernandez; Frank D. Cimino (57) ABSTRACT

A device includes a transformer having primary windings and secondary windings, and a transmit circuit coupled to the primary windings. The transmit circuit is configured to receive an input signal, and provide a carrier signal to the primary windings responsive to the input signal. The device also includes a receive circuit coupled to the secondary windings. The receive circuit is configured to receive the carrier signal from the secondary windings, and provide an output signal responsive to the carrier signal. The receive circuit includes a variable capacitor coupled in parallel to the secondary windings, and a spread spectrum modulation circuit configured to modulate a capacitance of the variable capacitor.

20 Claims, 7 Drawing Sheets

SPREAD SPECTRUM MODULATION TECHNIQUE FOR ISOLATION DEVICES

BACKGROUND

Isolation circuits (or "isolators") are interface circuits that provide galvanic isolation between two communicating devices or circuits. Isolators are useful to eliminate ground loops, and also to protect circuits from high voltages (e.g., voltages greater than what a circuit is able to tolerate). Isolators provide electric insulation and signal isolation between the communicating devices, and ideally do not allow electrons to flow from one communicating device to the other. Isolators also facilitate data transmission between the two communicating devices, and isolate communication signals from common mode noise and fast transients. Isolators are useful to improve safety and reliability in applications where common mode noise can be expected and human interactions are inevitable (e.g., cardiographs), and/or applications that may be susceptible to electrical surges, fast transients, and high noise floors (e.g., industrial applications).

SUMMARY

In accordance with an example of the description, a device includes a transformer having primary windings and secondary windings, and a transmit circuit coupled to the primary windings. The transmit circuit is configured to receive an input signal, and provide a carrier signal (e.g., a signal including data and/or instructions modulated by a carrier signal) to the primary windings responsive to the input signal. The device also includes a receive circuit coupled to the secondary windings. The receive circuit is configured to receive the carrier signal from the secondary windings, and provide an output signal responsive to the carrier signal. The receive circuit includes a variable capacitor coupled in parallel to the secondary windings, and a spread spectrum modulation circuit configured to modulate a capacitance of the variable capacitor.

In accordance with another example of the description, an isolation device includes a transmit circuit, an isolation barrier coupled to the transmit circuit, and a receive circuit coupled to the isolation barrier. The transmit circuit is configured to provide a carrier signal to the receive circuit, and the receive circuit is configured to modulate a frequency of the carrier signal.

In accordance with yet another an example of the description, a receive circuit is operable to be coupled to secondary windings of an isolation transformer. The isolation transformer includes primary windings coupled to transmit circuitry. The receive circuit includes a receiver coupled to the secondary windings, a first series combination of a first capacitor and a first transistor, and a second series combination of a second capacitor and a second transistor. The first series combination, the second series combination, the receiver, and the secondary windings are coupled in parallel. The receive circuit also includes a spread spectrum modulation circuit having a first output coupled to a control terminal of the first transistor and having a second output coupled to a control terminal of the second transistor.

BRIEF DESCRIPTION OF THE DRAWINGS

The same reference number or other reference designator are used in the drawings to designate the same or similar (functionally and/or structurally) features.

DETAILED DESCRIPTION

Different types of isolation barriers can be used as the core of an isolator. Depending on the medium used as the isolation barrier and the physical quality used to transfer data across the barrier, isolators can be classified as opto-isolators (or optocouplers), capacitive isolators, and inductive isolators.

Conventionally, opto-isolators utilize light-emitting diodes (LED) for isolation and have been used because of low cost, ease of fabrication, and lack of both radiative emissions and susceptibility to radiative emissions. However, opto-isolators may have limitations such as relatively lower data transmission speeds, temperature instability, degradation of the LED performance over time, and a relative difficulty in fabricating multichannel devices because of cross-talk issues.

Developments in complementary metal-oxide-semiconductor (CMOS) technology have enabled CMOS digital isolators that are comparable with opto-isolators with respect to speed and reliability, but that avoid some of the drawbacks of opto-isolators. However, numerous systems (e.g., legacy systems) currently use opto-isolators, and thus also use specific pin configurations and/or other specifications associated with such opto-isolators. Rather than requiring replacement systems designed around newer CMOS digital isolators, digital isolators may be designed to emulate existing opto-isolators, and are referred to herein as opto-emulated isolators. Opto-emulated isolators may be used in various applications, such as industrial motor-control drives, industrial power supplies (including uninterruptible power supplies, switched-mode power supplies, and the like), solar inverters, induction heating systems, Common mode noise in an isolator, such as an opto-emulated isolator, may produce radiated emissions because the isolator acts as a board plane antenna. For example, the isolator includes a transmit portion (e.g., circuit) and a receive portion (e.g., circuit) that are separated by the isolation barrier. The isolator board thus includes two floating conductors (e.g., the transmit and receive circuits) with respect to each other, which function as an equivalent dipole board antenna. Accordingly, radiated emissions are produced by common mode current (e.g., from a transmit portion of the isolator to a receive portion of the isolator) that excites the equivalent dipole board antenna. It may be useful to reduce or otherwise limit radiated emissions from opto-emulated isolators.

To address the foregoing, examples of this description include an isolator, such as an opto-emulated isolator, that includes a transmit circuit that is configured to transmit data across the isolation barrier using on-off keying (OOK), which can improve transient performance of the isolator. Also, spread spectrum modulation is used to modulate a frequency of the carrier signal used to transmit data using OOK, which reduces the effective emissions at a given frequency relative to implementing OOK using a carrier signal at a single frequency. An isolation barrier of the isolator may be, for example, a transformer (e.g., an inductive isolation barrier) and, specifically, the space between windings of a transformer. Thus, a change in the magnetic field is used to transfer data across the barrier. Accordingly, the transmit circuit is configured to provide the carrier signal (e.g., a signal including data and/or instructions modulated by a carrier signal) to primary windings of the transformer, while a receive signal is configured to receive the carrier signal from secondary windings of the transformer.

As described above, legacy systems may be configured to use opto-isolators, and thus also use specific pin configurations and/or other specifications associated with such opto-isolators. Accordingly, opto-emulated isolators may be designed to use the specific pin configurations and/or other specifications associated with the opto-isolators being emulated, which avoids redesigning replacement systems around different isolator configurations. For example, transmit circuits of opto-isolators derive their power from the input data signal (e.g., current to the opto-isolator is switched ON and OFF based on the input data signal). Accordingly, unlike other digital isolators, transmit circuits of opto-isolators do not need an external power supply.

The opto-emulated isolator described herein is designed to replace an LED-based isolator, and thus has been designed not to utilize an external power supply for its transmit circuit. Also, the opto-emulated isolator does not include a power supply pin to power its transmit circuit. Because the transmit circuit of the opto-emulated isolator does not include a power supply pin, and thus cannot be coupled to a power supply, an oscillator and associated control circuitry to implement spread spectrum modulation of the carrier signal cannot be implemented in the transmit circuit. However, the isolators described herein, including opto-emulated isolators, include a receive circuit that is adapted to be coupled to a power supply (e.g., to provide an output signal responsive to the carrier signal received from the transmit circuit).

In an example, the receive circuit also includes a spread spectrum modulation (SSM) circuit that is configured to cause the transmit circuit to modulate a frequency of the carrier signal that is used to transmit data using OOK to the receive circuit. The SSM circuit is configured to be powered by the power supply coupled to the receive circuit. In an example, the SSM circuit includes a variable capacitor, an oscillator, and digital logic configured to control a value (e.g., capacitance) of the variable capacitor. The variable capacitor is coupled in parallel with the secondary windings of the transformer described above. Accordingly, the variable capacitor and the secondary windings form a resonant LC circuit, and altering the capacitance of the variable capacitor alters an equivalent impedance of the LC circuit seen by the transmit circuit, which in turn alters the transmit frequency of the carrier signal. The SSM circuit is thus configured to modulate the value of the variable capacitor (e.g., in a time-dependent manner), which in turn modulates the frequency of the carrier signal provided by the transmit circuit and reduces radiated emissions of the isolator. These and other examples are described further below, with reference to the accompanying figures.

Figure 1:
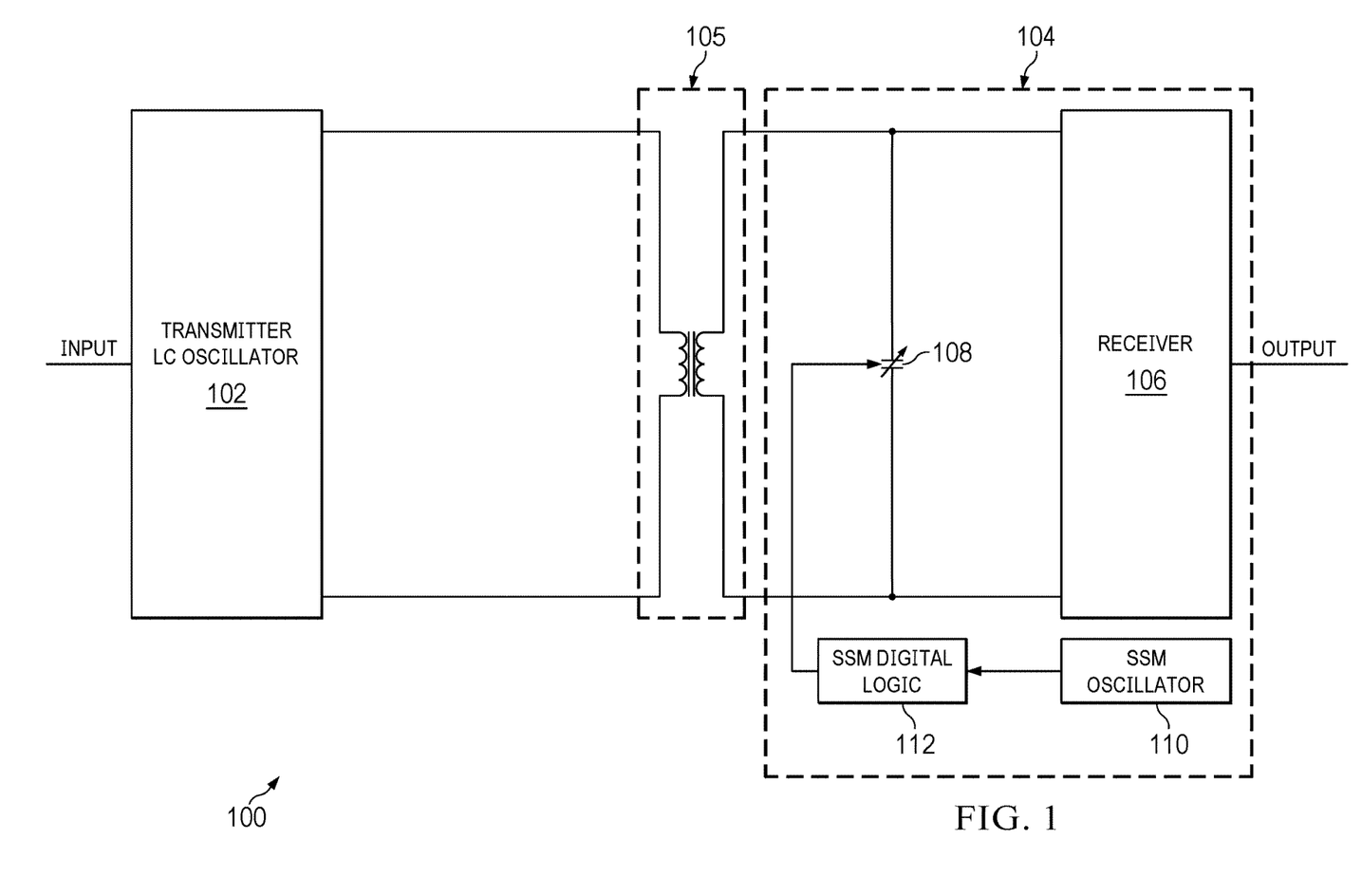
FIG. 1 is a schematic diagram of an isolator in accordance with various examples.

FIG. 1 is a schematic diagram of an isolator 100 in accordance with various examples. In the example of FIG. 1, the isolator 100 is an opto-emulated isolator 100 that includes a transmitter 102 (or a transmit circuit 102) and a receive circuit 104. The opto-emulated isolator 100 includes an isolation barrier, which is a transformer 105 having primary windings coupled to the transmitter 102, and secondary windings coupled to the receive circuit 104. Accordingly, the isolation barrier is the space between windings of the transformer 105, and thus a change in the magnetic field is used to transfer data across the isolation barrier (e.g., from the transmitter 102 to the receive circuit 104).

The transmitter 102 is configured to receive an input signal (INPUT), and to provide a carrier signal to the primary windings of the transformer 105. The transmitter 102 may be configured to transmit data using OOK, which can improve transient performance of the opto-emulated isolator 100. Accordingly, the transmitter 102 may include a LC oscillator that generates the carrier signal responsive to the input signal. For example, although not shown for simplicity, the transmitter 102 may include a cross-coupled LC oscillator, which uses negative resistance of one or more active transistors to provide a signal to the primary windings of the transformer 105 based on the input signal (INPUT). A carrier frequency of the ON-OFF signal (e.g., generated using OOK) provided to the primary windings of the transformer 105 may be based on the equivalent LC resonance of the cross-coupled LC oscillator.

As described above, because opto-isolator transmitters do not need an external power supply, the transmitter 102 of the opto-emulated isolator 100 does not include a power supply pin and is configured not to be coupled to a power supply, which allows the opto-emulated isolator 100 to be used in systems designed to use opto-isolators. For example, the opto-emulated isolator 100 may be pin-to-pin compatible with a standard opto-isolator.

The receive circuit 104 includes a receiver 106 that is configured to receive the carrier signal from the secondary windings of the transformer 105, and to provide an output signal (OUTPUT) responsive to the received carrier signal. The input to the transmitter 102 and the output from the receiver 106 are thus galvanically isolated by isolation barrier 105 (which may use any type of galvanic isolation even though a transformer is shown in FIG. 1). Although not shown for simplicity, the receiver 106 may include a preamplifier, a peak detector, and a comparator which function to decode the ON-OFF carrier signal received from the secondary windings of the transformer 105. The preamplifier may be configured to amplify the ON-OFF carrier signal received from the secondary windings of the transformer 105, and provide the amplified ON-OFF carrier signal to the peak detector and comparator, which determine (e.g., decode) an output signal and provide the decoded output signal as OUTPUT of the receiver 106.

The receive circuit 104 also includes a variable capacitor 108 (discussed in more detail below) that is coupled in parallel to the secondary windings of the transformer 105. A spread spectrum modulation (SSM) circuit of the receive circuit 104 includes an oscillator 110 and a digital logic circuit 112. The SSM circuit is configured to modulate a capacitance of the variable capacitor 108. For example, the oscillator 110 is configured to provide a clock signal to the digital logic circuit 112. The digital logic circuit 112 is configured to receive the clock signal, and to provide a capacitor control signal responsive to the clock signal. The capacitor control signal is configured to modulate the capacitance of the variable capacitor 108. As described above, the receive circuit 104 is adapted to be coupled to a power supply, such as to enable the receive circuit 104 to provide OUTPUT responsive to the carrier signal received from the transmitter 102. Accordingly, the oscillator 110 and the digital logic circuit 112 may be powered by the power supply that is coupled to the receive circuit 104, while a power supply may not be available for the transmitter 102, as described above. The SSM circuit is described as including digital logic circuit 112 for simplicity, and to illustrate the functionality of the SSM circuit. However, some or all of the functionality attributed herein to the digital logic circuit 112 may also be implemented using various analog components.

Spread spectrum modulation is used to modulate a frequency of the carrier signal used to transmit data (e.g., across the isolation barrier) using OOK, which reduces the effective radiated emissions at a given frequency relative to implementing OOK using a carrier signal at a single frequency. Because the transmitter does not include a power supply pin, and thus cannot be coupled to a power supply, an oscillator and associated control circuitry to implement spread spectrum modulation of the carrier signal cannot be implemented on the transmitter 102 side. However, as described further below, the SSM circuit on the receive circuit 104 side enables frequency modulation of the carrier signal provided by the transmitter 102, in order to implement spread spectrum modulation.

The variable capacitor 108 is coupled in parallel with the secondary windings of the transformer 105. Accordingly, the variable capacitor 108 and the secondary windings of the transformer 105 form a resonant LC circuit, and altering the capacitance of the variable capacitor 108 alters an equivalent impedance of the LC circuit seen by the transmitter. A frequency of the carrier signal provided by the transmitter 102 is dependent on the impedance of the resonant LC circuit (e.g., the variable capacitor 108 and the secondary windings of transformer 105). The SSM circuit is thus configured to modulate the value of the variable capacitor 108 (e.g., in a time-dependent manner responsive to the clock signal provided by oscillator 110), which in turn modulates the frequency of the carrier signal provided by the transmitter 102 and reduces radiated emissions of the opto-emulated isolator 100.

Figure 2:
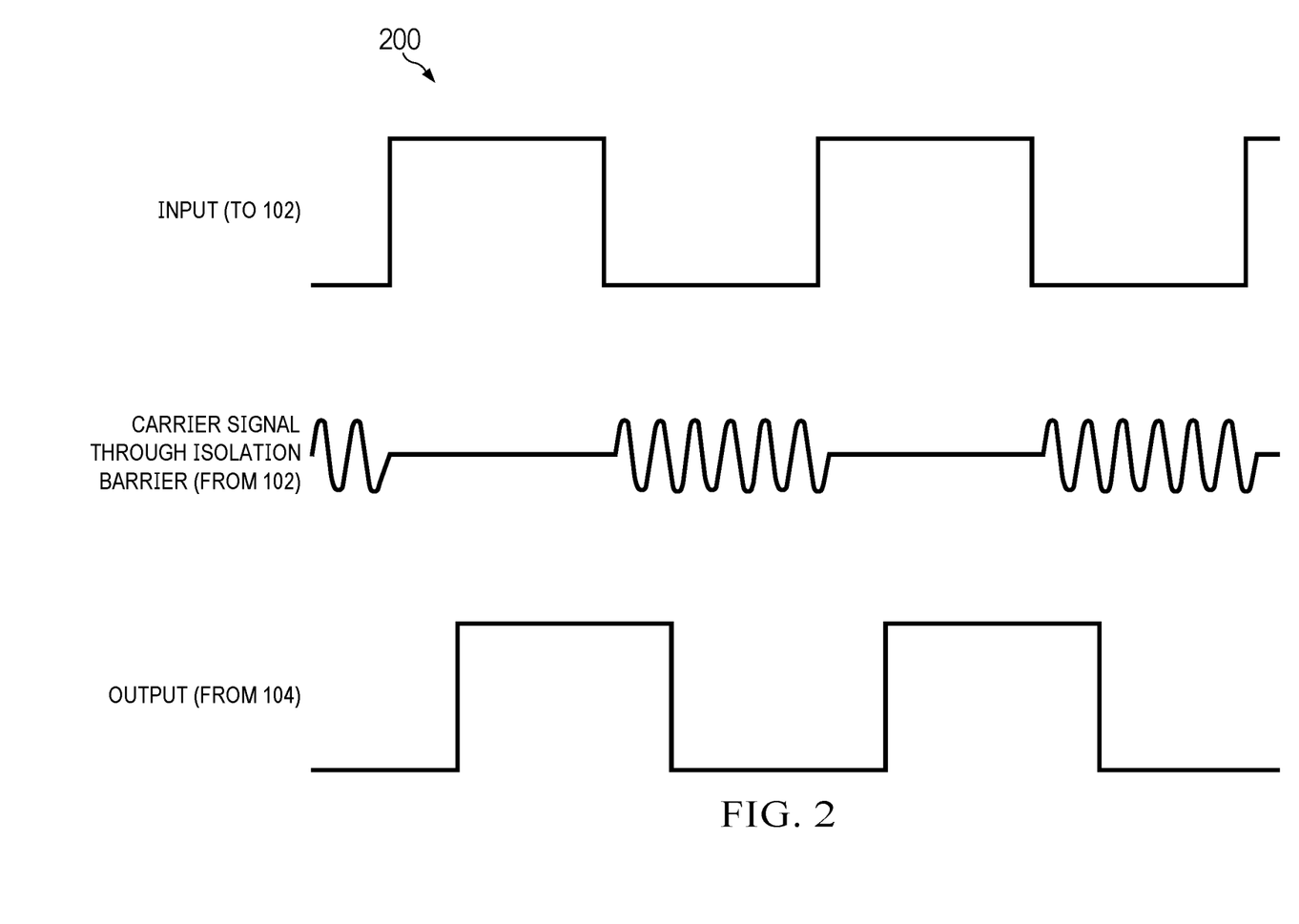
FIG. 2 is an example of an on-off keying (OOK) modulation scheme in accordance with various examples.

FIG. 2 is an example of an OOK modulation scheme in accordance with various examples. FIG. 2 includes a graph 200 of waveforms as a function of time, in which INPUT represents an example signal received as an input to the transmitter 102, Carrier Signal represents an example carrier signal generated by the transmitter 102 responsive to the INPUT signal, and OUTPUT represents an example signal provided by the receiver 106 as output responsive to the received carrier signal. In the example of FIG. 2, the carrier signal frequency is not shown as modulated (e.g., spread spectrum modulation is not illustrated) for simplicity. However, spread spectrum modulation is applied in practice as described herein.

As described above, the carrier signal provided by the transmitter 102 has an OOK modulation scheme to transmit the digital data (e.g., INPUT) across the isolation barrier/transformer 105. The transmitter 102 is configured to provide a high-frequency carrier signal across the isolation barrier/transformer 105 to represent one digital state (e.g., logic LOW) and sends no signal to represent the other digital state (e.g., logic HIGH). The receiver 106 is configured to demodulate the signal and produces the OUTPUT through a buffer stage (not shown for simplicity).

Figure 3A:
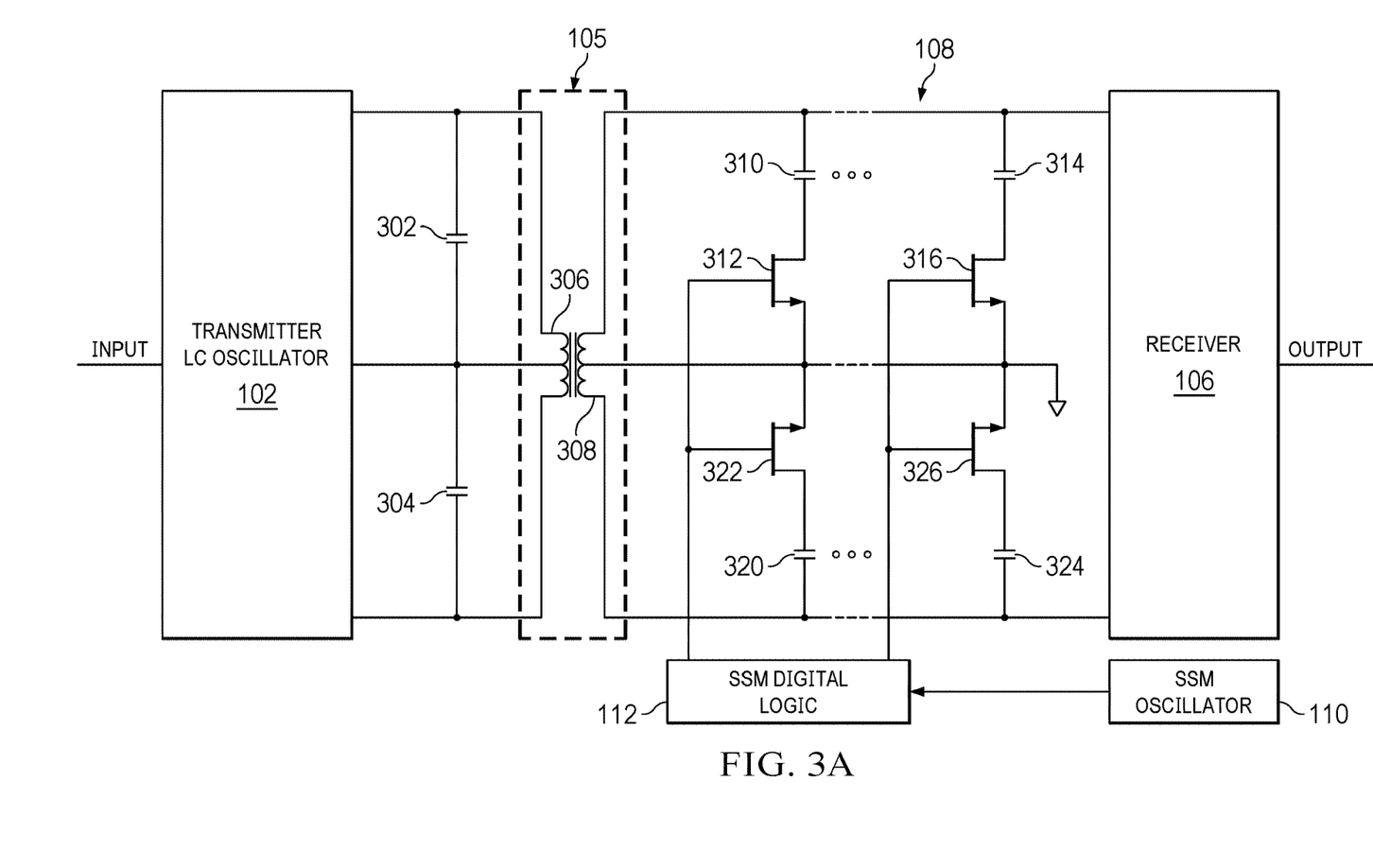
FIG. 3A is a schematic diagram of the isolator of FIG. 1 in further detail and in accordance with various examples.

FIG. 3A is a schematic diagram of one implementation of the isolator 100 of FIG. 1 in further detail and in accordance with various examples. In FIG. 3A, elements that are like-numbered with those in FIG. 1 have the same general functions described above with respect to FIG. 1. Additional elements and features thereof, which are specific to FIG. 3A, are described below.

For example, in FIG. 3A, transmitter resonance capacitors 302, 304 are coupled to the transmitter 102 as shown. A ratio of the capacitance of capacitors 302, 304 to the variable capacitor 108 on the receiver 106 side determines a range of frequency variation that is attainable when varying the capacitance of the variable capacitor 108. The capacitors 302, 304 are also useful to reduce common mode noise in some examples.

In FIG. 3A, the primary windings 306 of the transformer 105 include a center tap, which divides the primary windings 306 into a first portion (e.g., between the center tap and a first end of the primary windings 306) and a second portion (e.g., between the center tap and a second end of the primary windings 306). The capacitor 302 is coupled in parallel to the first portion of the primary windings 306, while the capacitor 304 is coupled in parallel to the second portion of the primary windings 306. The transmitter 102 is configured to provide the carrier signal to the primary windings 306 responsive to the INPUT signal. Because the primary windings 306 include the center tap, the carrier signal is thus provided to the secondary windings 308 as a differential carrier signal. The secondary windings 308 of the transformer 105 also include a center tap that is coupled to a ground terminal, which enables receiving the differential carrier signal and providing the differential carrier signal to the receiver 106. The secondary windings 308 also include a first portion (e.g., between the center tap and a first end of the secondary windings 308) and a second portion (e.g., between the center tap and a second end of the secondary windings 308).

In the example of FIG. 3A, the variable capacitor 108 is implemented as a plurality of series combinations of capacitors and transistors. The digital logic circuit 112 is configured to provide capacitor control signal(s) to control the operation of the transistors (e.g., whether the transistors are ON or OFF) to vary the overall capacitance of the variable capacitor 108.

For example, the variable capacitor 108 includes a first series combination of a first capacitor 310 and a first transistor 312. The variable capacitor 108 also includes a second series combination of a second capacitor 314 and a second transistor 316. The first series combination 310, 312; the second series combination 314, 316; and the first portion of the secondary windings 308 are in parallel. Further, the variable capacitor 108 includes a third series combination of a third capacitor 320 and a third transistor 322. The variable capacitor 108 also includes a fourth series combination of a fourth capacitor 324 and a fourth transistor 326. The third series combination 320, 322; the fourth series combination 324, 326; and the second portion of the secondary windings 308 are in parallel. Additional series combinations of capacitors and transistors are possible in other implementations, represented by the ellipses in FIG. 3A. In the example of FIG. 3A, the transistors 312, 316, 322, 326 are n-type metal-oxide-semiconductor field-effect transistors (MOS-FETs). However, in other examples, the transistors 312, 316, 322, 326 may be of different types.

The digital logic circuit 112 of the SSM circuit is configured to control the transistors 312, 316, 322, 326 (e.g., provide gate drive signals to the transistors 312, 316, 322, 326 to turn them ON or OFF). For example, the digital logic circuit 112 is configured to provide a first gate drive signal to the gates of the first transistor 312 and the third transistor 322 so that the first and third transistors 312, 322 are controlled together. Also, the digital logic circuit 112 is configured to provide a second gate drive signal to the gates of the second transistor 316 and the fourth transistor 326 so that the second and fourth transistors 316, 326 are controlled together. In this example, the first gate drive signal being asserted and the second gate drive signal being de-asserted (or vice versa) causes the variable capacitor 108 to have a first capacitance value. Continuing this example, both the first and second gate drive signals being asserted causes the variable capacitor 108 to have a second capacitance value, while both the first and second gate drive signals being de-asserted causes the variable capacitor 108 to have a third capacitance value.

As explained above, by varying the capacitance of the variable capacitor 108 in a time-dependent manner, the effective impedance of the resonant LC circuit formed by the secondary windings 308 and the variable capacitor 108 also varies over time, which modulates the frequency of the carrier signal provided by the transmitter 102. Using spread spectrum modulation to modulate the frequency of the carrier signal used to transmit data using OOK reduces the effective radiated emissions at a given frequency relative to implementing OOK using a carrier signal at a single frequency. Also, by implementing spread spectrum modulation on the receiver side, the isolator 100 can be used as an opto-emulated isolator 100, which does not use a power supply pin coupled to the transmitter 102. That is, the isolator 100 can be an opto-emulated isolator 100 that is designed to be pin-to-pin compatible with a standard opto-isolator, while still implementing spread spectrum modulation to reduce effective radiated emissions relative to conventional opto-emulated isolators.

Figure 3B:
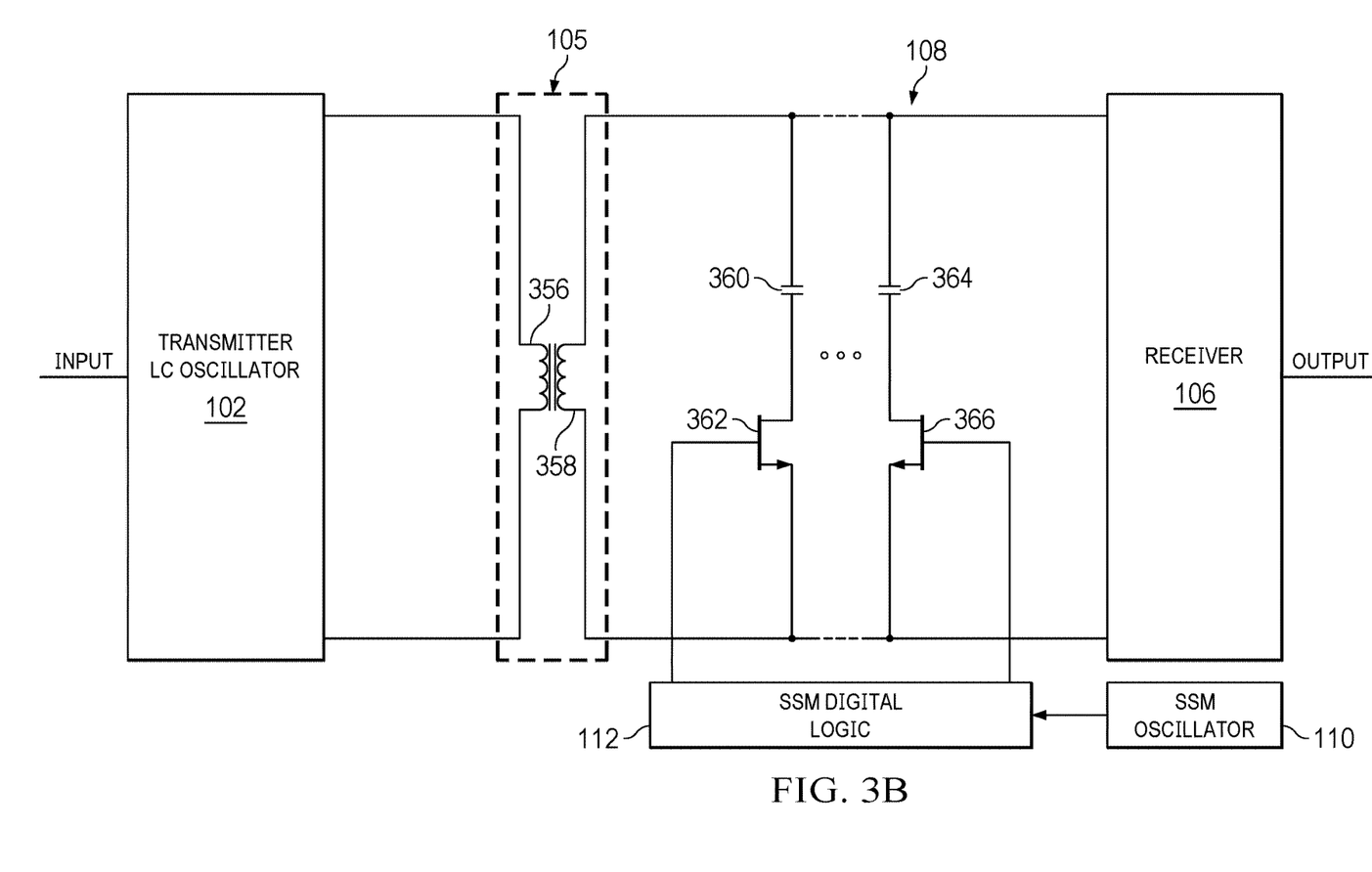
FIG. 3B is a schematic diagram of the isolator of FIG. 1 in further, alternate detail and in accordance with various examples.

FIG. 3B is a schematic diagram of another implementation of the isolator 100 of FIG. 1 in further detail and in accordance with various examples. As in FIG. 3A, elements that are like-numbered with those in FIG. 1 have the same general functions described above with respect to FIG. 1. Additional elements and features thereof, which are specific to FIG. 3B, are described below.

For example, in FIG. 3B, the primary windings 356 of the transformer 105 do not include a center tap as in FIG. 3A. The transmitter 102 is configured to provide the carrier signal to the primary windings 356 responsive to the INPUT signal, but in a single-ended fashion rather than as a differential carrier signal. Accordingly, the carrier signal is also provided to the secondary windings 358 as a single-ended carrier signal. The secondary windings 358 of the transformer 105 also do not include a center tap in this example, so that a single-ended carrier signal is provided to the receiver 106.

In the example of FIG. 3B, the variable capacitor 108 is implemented as a plurality of series combinations of capacitors and transistors. The digital logic circuit 112 is configured to provide capacitor control signal(s) to control the operation of the transistors (e.g., whether the transistors are ON or OFF) to vary the overall capacitance of the variable capacitor 108.

For example, the variable capacitor 108 includes a first series combination of a first capacitor 360 and a first transistor 362. The variable capacitor 108 also includes a second series combination of a second capacitor 364 and a second transistor 366. The first series combination 360, 362; the second series combination 364, 366; and the secondary windings 358 are in parallel. Additional series combinations of capacitors and transistors are possible in other implementations, represented by the ellipses in FIG. 3B. In the example of FIG. 3B, the transistors 362, 366 are n-type MOSFETs. However, in other examples, the transistors 362, 366 may be of different types.

The digital logic circuit 112 of the SSM circuit is configured to control the transistors 362, 366 (e.g., provide gate drive signals to the transistors 362, 366 to turn them ON or OFF). For example, the digital logic circuit 112 is configured to provide a first gate drive signal to the gate of the first transistor 362. Also, the digital logic circuit 112 is configured to provide a second gate drive signal to the gate of the second transistor 366. In this example, the first gate drive signal being asserted and the second gate drive signal being de-asserted (or vice versa) causes the variable capacitor 108 to have a first capacitance value. Continuing this example, both the first and second gate drive signals being asserted causes the variable capacitor 108 to have a second capacitance value, while both the first and second gate drive signals being de-asserted causes the variable capacitor 108 to have a third capacitance value.

As explained above, by varying the capacitance of the variable capacitor 108 in a time-dependent manner, the effective impedance of the resonant LC circuit formed by the secondary windings 358 and the variable capacitor 108 also varies over time, which modulates the frequency of the carrier signal provided by the transmitter 102. Using spread spectrum modulation to modulate the frequency of the carrier signal used to transmit data using OOK reduces the effective radiated emissions at a given frequency relative to implementing OOK using a carrier signal at a single frequency. Also, by implementing spread spectrum modulation on the receiver side, the isolator 100 can be used as an opto-emulated isolator 100, which does not use a power supply pin coupled to the transmitter 102. That is, the isolator 100 can be an opto-emulated isolator 100 that is designed to be pin-to-pin compatible with a standard opto-isolator, while still implementing spread spectrum modulation to reduce effective radiated emissions relative to conventional opto-emulated isolators.

Figure 4A:
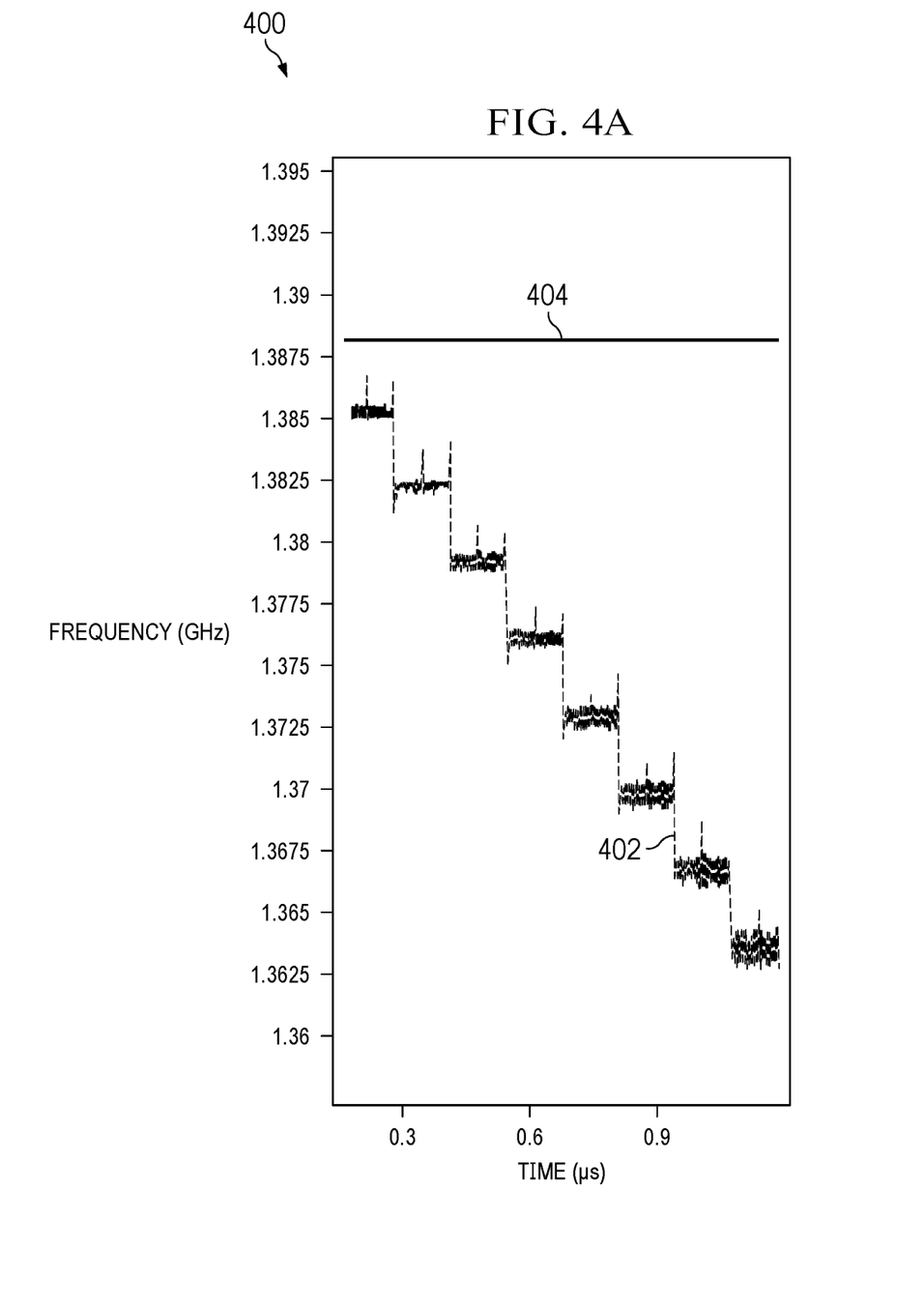
FIG. 4A is a graph of example carrier signal frequencies as a function of time in accordance with various examples.

FIG. 4A is a graph 400 of example carrier signal frequencies as a function of time in accordance with various examples. The graph 400 includes a waveform 402 that illustrates how the frequency of the carrier signal is modulated responsive to varying the capacitance of the variable capacitor 108, such as by the SSM circuit (or digital logic circuit 112 thereof). In this example, the capacitance of the variable capacitor 108 (and thus the frequency of the carrier signal) is modulated in a stairstep manner as a function of time. However, the capacitance of the variable capacitor 108 (and thus the frequency of the carrier signal) may be modulated in other fashions as well, including various changing-code waveforms, triangular waveforms, sawtooth waveforms, and the like. Referring again to the specific example of the graph 400, the resultant frequency of the carrier signal varies between a frequency of approximately 1.385 GHz and 1.3625 GHz as the capacitance of the variable capacitor 108 (and thus the impedance of the resonant LC circuit formed by the secondary windings 308 (or 358) and the variable capacitor 108) is increased over time. Although not shown for simplicity, the frequency of the carrier signal may be subsequently increased in a stairstep manner (e.g., back to 1.385 GHz) by decreasing the capacitance of the variable capacitor 108 (and thus the impedance of the resonant LC circuit formed by the secondary windings 308 (or 358) and the variable capacitor 108). The graph 400 also includes a waveform 404, which represents the frequency of a carrier signal that is not modulated (e.g., the SSM circuit is not used).

Figure 4B:
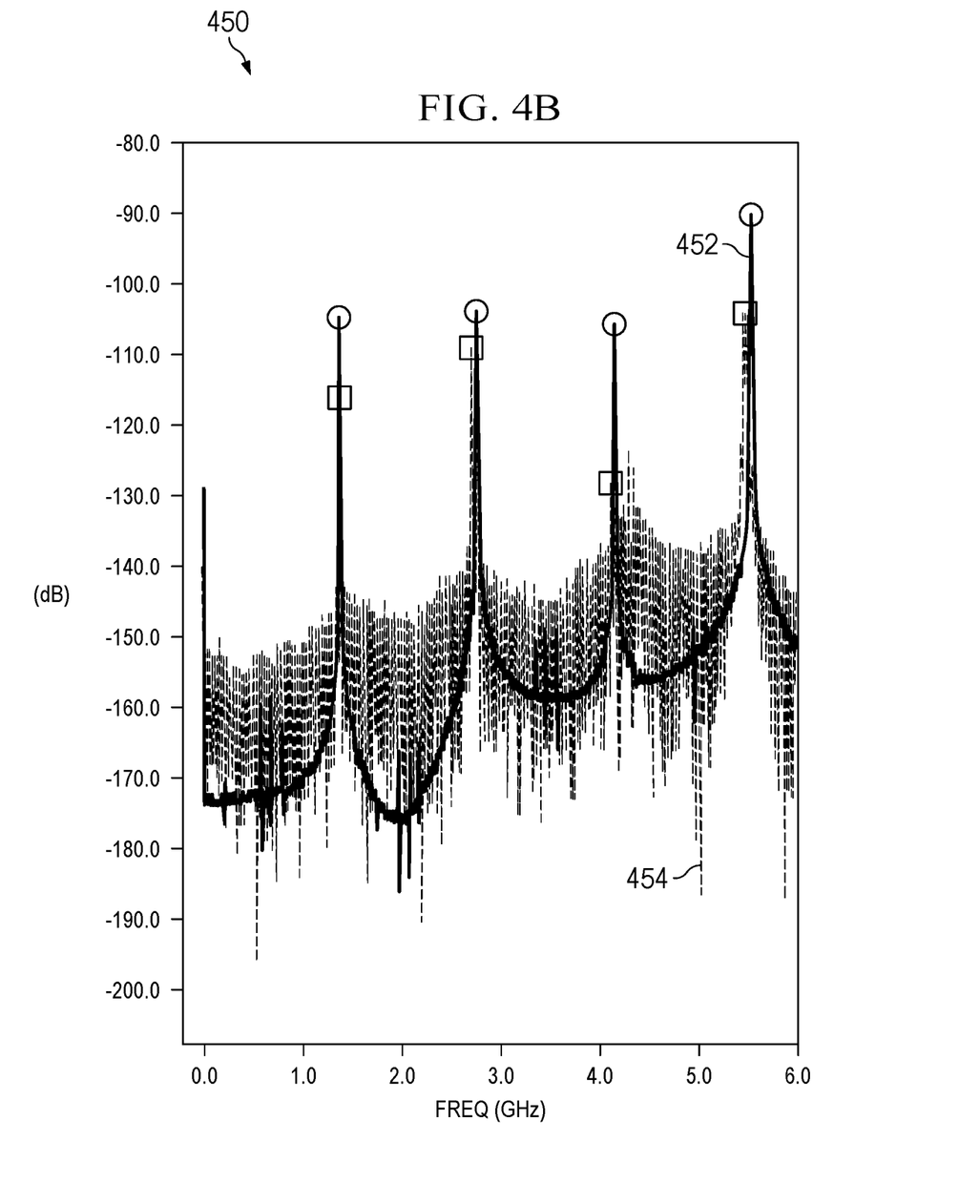
FIG. 4B is a graph of reduced signal strength of radiated emissions using the isolators of FIGS. 1 and 3 in accordance with various examples.

FIG. 4B is a graph 450 of reduced signal strength of radiated emissions using the isolators 100 of FIGS. 1 and 3 in accordance with various examples. A first plot 452 corresponds to the radiated emissions of an isolator for which spread spectrum modulation is not used (e.g., the frequency of the carrier signal is not modulated). A second plot 454 corresponds to the radiated emissions of an isolator, such as the opto-emulated isolator 100 described above, for which spread spectrum modulation is implemented, such as by including the SSM circuit on the receive side of the isolator 100.

In the first plot 452, the signal strength of radiated emissions has peaks at the unmodulated frequency of the carrier signal shown in waveform 404 (e.g., 1.388 GHz), and harmonics thereof. However, in the second plot 454, the signal strength of radiated emissions has peaks at similar frequencies as the first plot, but with 10-15 dB reductions in radiated emissions at those peaks. Additionally, in the second plot 454, the signal strength of radiated emissions is stronger (although still relatively weak compared to the peaks) in other frequency bins as a result of employing spread spectrum modulation.

Figure 5:
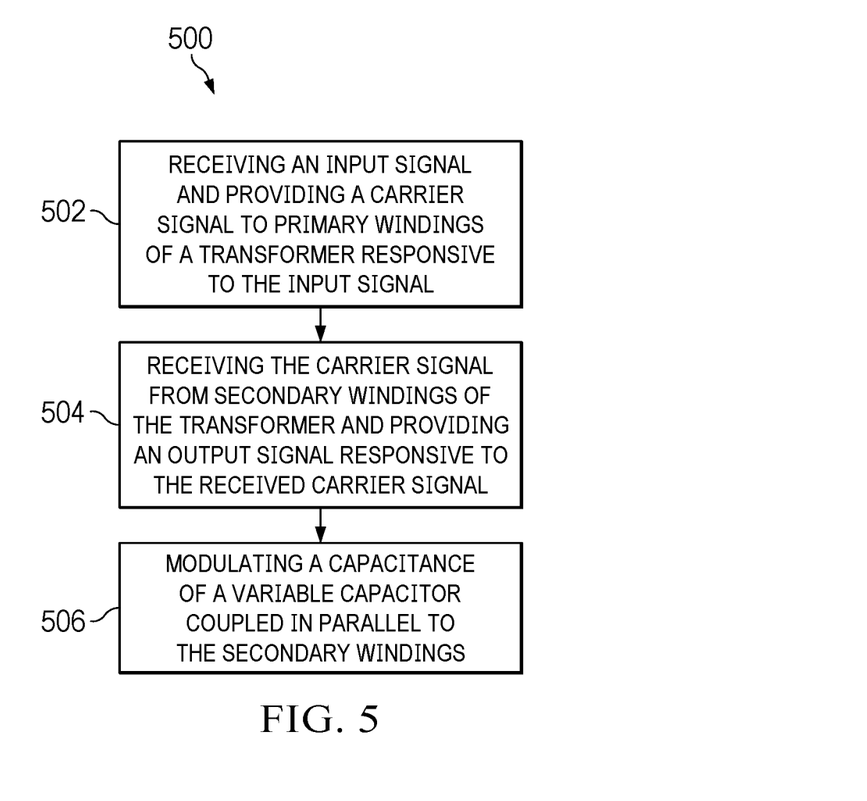
FIG. 5 is a flow chart of a method for reducing radiated emissions in an isolator in accordance with various examples.

FIG. 5 is a flow chart of a method 500 for reducing radiated emissions in an isolator in accordance with various examples.

The method 500 begins in block 502 with receiving an input signal and providing a carrier signal to primary windings of a transformer responsive to the input signal. For example, as described above, the transmitter 102 is configured to receive an input signal (INPUT), and to provide a carrier signal to the primary windings of the transformer 105. The transmitter 102 may be configured to transmit data using OOK, which can improve transient performance of the opto-emulated isolator 100. Accordingly, the transmitter 102 may include a LC oscillator that generates the carrier signal responsive to the input signal.

The method 500 continues in block 504 with receiving the carrier signal from secondary windings of the transformer and providing an output signal responsive to the received carrier signal. For example, as described above, the receive circuit 104 includes a receiver 106 that is configured to receive the carrier signal from the secondary windings of the transformer 105, and to provide an output signal (OUTPUT) responsive to the received carrier signal. The input to the transmitter 102 and the output from the receiver 106 are thus galvanically isolated.

The method 500 then continues in block 506 with modulating a capacitance of a variable capacitor coupled in parallel to the secondary windings. For example, the receive circuit 104 also includes a variable capacitor 108 that is coupled in parallel to the secondary windings of the transformer 105. A spread spectrum modulation (SSM) circuit of the receive circuit 104 includes an oscillator 110 and a digital logic circuit 112. The SSM circuit is configured to modulate a capacitance of the variable capacitor 108. For example, the oscillator 110 is configured to provide a clock signal to the digital logic circuit 112. The digital logic circuit 112 is configured to receive the clock signal, and to provide a capacitor control signal responsive to the clock signal. The capacitor control signal is configured to modulate the capacitance of the variable capacitor 108. As described above, the receive circuit 104 is adapted to be coupled to a power supply, such as to enable the receive circuit 104 to provide OUTPUT responsive to the carrier signal received from the transmitter 102. Accordingly, the oscillator 110 and the digital logic circuit 112 may be powered by the power supply that is coupled to the receive circuit 104, while a power supply is not available for the transmitter 102, as described above.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B. As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an integrated circuit, a device or other electronics or semiconductor component. While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs). While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero. Modifications are possible in the described examples, and other examples are possible within the scope of the claims.

What is claimed is:

1. A device, comprising:
   a transformer having primary windings and secondary windings;
   a transmit circuit coupled to the primary windings and configured to:
      receive an input signal; and
      provide a carrier signal to the primary windings responsive to the input signal; and
   a receive circuit coupled to the secondary windings and configured to:
      receive the carrier signal from the secondary windings; and
      provide an output signal responsive to the carrier signal;
   wherein the receive circuit includes:
      a variable capacitor circuit coupled in parallel to the secondary windings; and
      a spread spectrum modulation circuit configured to modulate a capacitance of the variable capacitor circuit.

2. The device of claim 1, wherein the transmit circuit does not include a power supply pin and is configured not to be coupled to a power supply, and wherein the receive circuit is configured to be coupled to a power supply.

3. The device of claim 2, wherein a frequency of the carrier signal is modulated responsive to the capacitance of the variable capacitor circuit being modulated.

4. The device of claim 2, wherein the transmit circuit is configured to provide the carrier signal responsive to the input signal according to an on-off keying modulation scheme.

5. The device of claim 1, wherein the spread spectrum modulation circuit includes:
   an oscillator configured to provide a clock signal; and
   a digital logic circuit configured to:
      receive the clock signal from the oscillator; and
      provide a capacitor control signal responsive to the clock signal, wherein the capacitor control signal is configured to modulate the capacitance of the variable capacitor circuit.

6. The device of claim 5, wherein the digital logic circuit is configured to modulate the capacitance of the variable capacitor circuit in a stairstep manner as a function of time.

7. The device of claim 1, wherein the variable capacitor circuit includes:
   a first series combination of a first capacitor and a first transistor; and
   a second series combination of a second capacitor and a second transistor, wherein the first series combination, the second series combination, and the secondary windings are in parallel;
   wherein the spread spectrum modulation circuit is configured to control the first and second transistors to modulate the capacitance.

8. The device of claim 1, wherein the secondary windings include a center tap that divides the secondary windings into a first portion and a second portion, and wherein the variable capacitor circuit includes:
   a first series combination of a first capacitor and a first transistor;
   a second series combination of a second capacitor and a second transistor, wherein the first series combination, the second series combination, and the first portion of the secondary windings are in parallel;
   a third series combination of a third capacitor and a third transistor; and
   a fourth series combination of a fourth capacitor and a fourth transistor, wherein the third series combination, the fourth series combination, and the second portion of the secondary windings are in parallel;
   wherein the spread spectrum modulation circuit is configured to control the first and third transistors together, and the second and fourth transistors together, to modulate the capacitance.

9. The device of claim 8, wherein the primary windings include a center tap and provide the carrier signal to the secondary windings as a differential carrier signal.

10. An isolation device, comprising:
a transmit circuit;
a transformer coupled to the transmit circuit;
a receive circuit coupled to the transformer; and
a variable capacitor circuit coupled to the receive circuit;
   wherein the transmit circuit is configured to provide a carrier signal to the receive circuit; and
wherein the receive circuit is configured to modulate the capacitance of the variable capacitor circuit to modulate the frequency of the carrier signal.

11. The isolation device of claim 10, wherein the transmit circuit is configured to provide the carrier signal to the receive circuit across the transformer responsive to an input signal, and wherein the receive circuit is configured to provide an output signal responsive to the received carrier signal across the transformer.

12. The isolation device of claim 11, wherein the transmit circuit is configured to provide the carrier signal responsive to the input signal according to an on-off keying modulation scheme.

13. The isolation device of claim 10, wherein the transmit circuit does not include a power supply pin and is configured not to be coupled to a power supply, and wherein the receive circuit is configured to be coupled to a power supply.

14. The isolation device of claim 10, wherein the receive circuit is configured to modulate the capacitance of the variable capacitor circuit in a stairstep manner, a triangle manner, or a sawtooth manner as a function of time.

15. The isolation device of claim 10, wherein the variable capacitor circuit includes:
   a first series combination of a first capacitor and a first transistor; and
   a second series combination of a second capacitor and a second transistor, wherein the first series combination, the second series combination, and an element of the transformer are in parallel; and
   wherein the receive circuit is configured to control the first and second transistors to modulate the capacitance.

16. The isolation device of claim 10, wherein the transmit circuit is configured to provide the carrier signal to the receive circuit as a differential carrier signal.

17. A circuit comprising:
   a receiver;
   a first series combination of a first capacitor and a first transistor;
   a second series combination of a second capacitor and a second transistor, wherein the first series combination and the second series combination are coupled in parallel; and
   a spread spectrum modulation circuit having a first output coupled to a control terminal of the first transistor and having a second output coupled to a control terminal of the second transistor, and the first series combination and the second series combination coupled to the receiver.

18. The circuit of claim 17, wherein a carrier signal frequency received by the circuit is modulated responsive to turning on/off the first transistor, the second transistor, or both the first transistor and the second transistor.

19. The circuit of claim 18, wherein the receiver is configured to receive the carrier signal as a differential carrier signal.

20. A circuit comprising:
   a receiver;
   a first series combination of a first capacitor, a second capacitor, a first transistor and a second transistor;
   a second series combination of a third capacitor, a fourth capacitor, a third transistor and a fourth transistor, wherein the first series combination and the second series combination are coupled in parallel; and
   a primary circuit having a first output coupled to control terminals of the first and second transistors and having a second output coupled to control terminals of the third and fourth transistors, and the first series combination and the second series combination coupled to the receiver.

* * * * *